Feb. 13, 1968  A. S. HERMAN, JR  3,368,371
FLEXIBLE COUPLING
Filed March 21, 1966

INVENTOR.
ARTHUR S. HERMAN, JR.
BY
his Attorney

United States Patent Office 3,368,371
Patented Feb. 13, 1968

3,368,371
FLEXIBLE COUPLING
Arthur S. Herman, Jr., Lutherville, Md., assignor to Koppers Company, Inc., a corporation of Delaware
Filed Mar. 21, 1966, Ser. No. 536,042
5 Claims. (Cl. 64—27)

ABSTRACT OF THE DISCLOSURE

A pair of generally aligned but axially spaced shafts are connected by a spindle that has a gear-type coupling at one end and a sound absorbing and torsionally resilient coupling at the other end. In the gear-type coupling, internal spur gear teeth on the drive shaft coact with external teeth on the spindle. At the other end of the spindle, radially and axially projecting blades are alternately interleaved with radially and axially projecting blades on the driven shaft and a plurality of endless elastomeric bands in the alternate spaces between the blades connect the blades in cooperating pairs to provide the sound absorbing and torsional resilient coupling.

---

Figure 4:
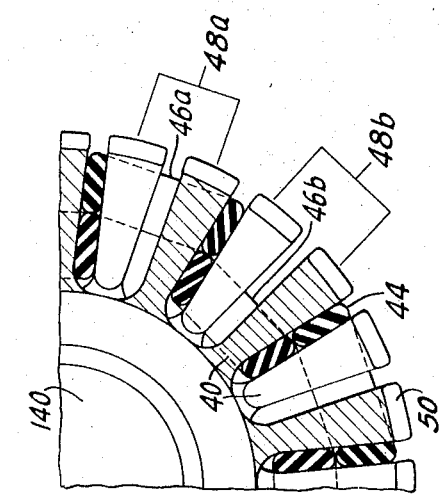

This invention relates generally to flexible couplings for transmitting rotary motion between two generally aligned shafts and for isolating the sound between driving and driven shafts.

In certain applications, the ability to transmit gases, and especially hot gases, through a hollow conduit in the driving and driven shafts is required. For example, the hot exhaust gases from a turbine drive are sometimes vented through the drive shaft. In such applications, it is also advantageous to be able to isolate the sound generated by the turbine. It is also advantageous that the coupling be capable of sealing the exhaust gases within the drive shaft. Conventional couplings normally use only one set of seals for the purpose of retaining lubricant within the coupling. It is not usually necessary to separate the lubricant from hot gases within the drive shaft. In such environments couplings must be capable of transmitting high-torques at a high temperature, for example, 500° F., in a small space. Generally, couplings utilizing rubber elements to isolate sound or damp shock loads or the like are quite large in relation to their torque transmitting capacity, especially where they are subject to stresses imposed by axial, offset and angular misalignment. Control of the axial position of the drive shaft is also important, since axial displacement may result in unwanted thrust forces upon bearings and the like.

Accordingly, an object of the present invention is to provide a sound damping and torsionally resilient flexible shaft coupling utilizing a plurality of resilient elements in compression capable of transmitting high torque at high temperature in a small space while sealing hot gases within a hollow conduit in the driving and driven shafts with provision for maintaining control of the axial position of the shafts.

A further object of the present invention is to provide a spindle type flexible shaft coupling having gear type coupling elements at one end thereof and sound damping and torsionally resilient elements at the other end thereof capable of sealing fluid within hollow portions of the coupled shafts.

The invention contemplates the provision of a flexible coupling for connecting a driving shaft to a driven shaft by plurality of resilient endless compressible elements connecting interleaved blades formed on coupling hubs mounted in substantial alignment on the respective shafts and further providing a plurality of sealing elements between cooperating sections of the coupling hubs to contain hot gases within the shafts and to contain lubricant within the driving parts of a portion of the coupling.

More specifically, the invention contemplates the provision of a spindle having a gear type coupling on one end thereof and a sound absorbing and torsionally resilient coupling on the other end thereof with sealing means in both couplings to seal hot exhaust gases within the coupling and shafts.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

Figure 3:
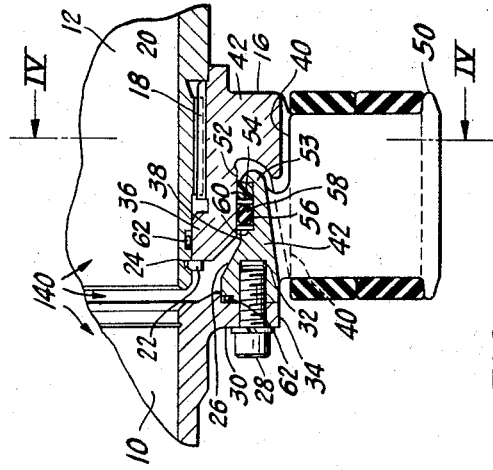
Figure 1:
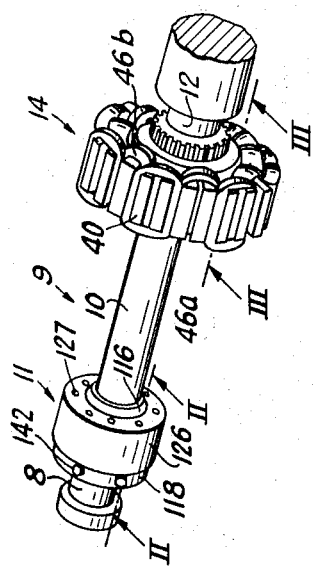
Figure 2:
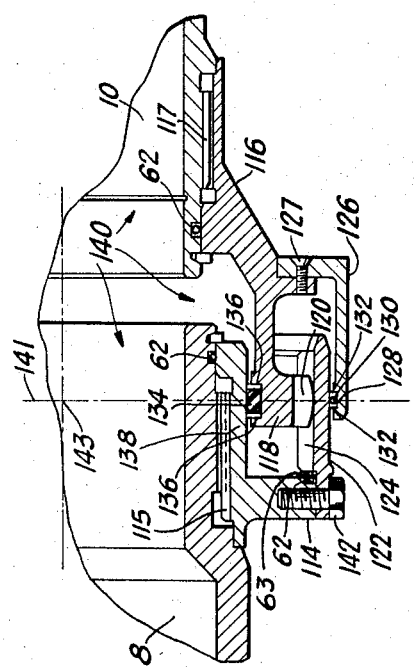

In the drawings wherein like parts are marked alike:
FIGURE 1 is an isometric view of the preferred embodiment of the novel coupling;
FIGURE 2 is a radial view of the coupling in partial cross-section along line II—II;
FIGURE 3 is a radial view of the coupling in partial cross-section along line III—III of FIGURE 1, and
FIGURE 4 is an axial view in partial cross-section along line IV—IV of FIGURE 3.

Referring now to FIGURE 1, shaft 8 is connected to shaft 12 by the novel spindle type flexible shaft coupling 9 which as illustrated herein includes a gear type coupling 11 at one end and a resilient damping coupling 14 at the other end. The coupling is capable of conducting hot gases from one end of shaft 10 to the other end.

Referring now to FIGURE 3, the substantially aligned and abutting shafts 10 and 12 are coupled in driving relationship by sound damping and torsionally resilient coupling 14. A hub 16 is mounted for rotation with shaft 12 and a hub 26 is mounted for rotation with shaft 10. Splines 18 on the shaft 12 engage in slots the bore of hub 16. Axial location of hub 16 on shaft 12 is accomplised by urging hub 16 against a shoulder 20 provided on shaft 12 with a snap ring 22 seated in a suitable groove 24 provided in shaft 12. On the other hand, hub 26 is secured to spindle 10 by passing bolts 32 through a flange 30 provided on spindle 10 and threading them in holes 32 provided in a shoulder 34 on hub 26. Thus, hubs 16 and 26 are similar except for the manner of mounting and except that hub 16 has a tubular male projection 36 which is loosely received in a corresponding female tubular recess 38 in hub 26 so that there is a nesting of the hubs. The reason for this will become apparent as the description continues.

Each hub 16, 26 has an even number of radially and axially projecting blades 40 spaced substantially equally around the periphery of the hub. The base 42 of each blade 40, where it joins the hub, is about half the axial length of the remaining outer portion of the blade. This arrangement permits the blades 40 of the respective hubs to radially and axially overlap; that is, the blades 40 of hub 16 loosely occupy the spaces between blades 40 of of hub 26 and vice-versa. Such arrangement of the blades will hereinafter be referred to as being "interleaved."

The blades 40, as shown in FIGURE 3, do not occupy the entire angular segment so that spaces exist between the blades. With the blades 40 substantially annularly centered in the spaces, a clearance space 44 remains on either side of the blade; that is, between it and the two adjacent blades of the opposite hub. Resilient endless bands 46a, 46b are placed in alternate clearance spaces 44. With the blades 40 interleaved, alternate pairs of blades 48a, 48b are joined together by a band 46a or 46b encircling them. Each pair of blades 48a, 48b consists of one blade 40 of each hub 16, 26. As best illustrated in FIGURE 4, alternate pairs of blades 48a are joined by bands 46a and alternate pairs of blades 48b are joined by bands 46b. In this manner, alternate spaces 44 are substantially filled with the compressible bands 46a, 46b. Thus, each blade 40 of hub 16 coacts with corresponding blades 40 of hub 26 through bands 46a, 46b thereby compressing the portion of the bands passing between the blades upon rotation of the coupling.

With the foregoing arrangement, coupling 14 is joined for unidirectional rotation. If the spindle 10 is rotated reverse to normal driving rotation, the blades 40 forming pairs of blades 48a, 48b merely coact against each other with no bands between them. The coupling may be assembled for reverse rotation by simply moving the bands one space clockwise. The coupling may be assembled for bidirectional rotation, in the embodiment of FIGURE 4, by placing the outer bands 46a in alternate spaces 44 with respect to inner bands 46b. With only half as much rubber in compression, the torque capacity of the coupling will be halved. To maintain full torque capacity regardless of the direction of rotation, the bands 46a, 46b, are placed around the same pair of blades 48a, 48b. However, when the coupling is not being rotated, the blades 40 of each pair of blades 48a, 48b will come together in metal to metal contact.

Bands 46a, 46b, FIGURE 4, are endless circular bands, preferably rectangular in cross-section with rounded corners, resembling ordinary ruber bands. Bands 46a span a greater annular distance than do bands 46b and are preferably circumferentially longer although they may both be the same size and the outer band stretched at assembly. The annular width of the bands is advantageous made to snugly fill the space 44 between adjacent blades 40. The bands 46a, 46b are slipped over the pairs of blades 48a, 48b and held in place against centrifugal force by axial lip portions 50 provided on blades 40. Bands 46a, 46b are preferably made of rubber although synthetic rubber may be desirable in applications where they are exposed to corrosive atmospheres, oils or the like. In high temperature applications, the bands are advantageously made of silicone rubber because of its resistance to heat. For example, compound XS-34, available from Reliable Rubber Products Company, Eddington, Bucks County, Pa., has performed satisfactorily in laboratory tests of the present coupling transmitting 2,400 inch-pounds of torque per inch of diameter of the coupling at 1,500 revolutions per minute at 500° F. with 1° of angular misalignment.

Referring now to FIGURE 2 driving shaft 8 is substantially aligned with and abutting spindle 10 and coupled in driving relationship by a gear coupling. Advantageously, this coupling is of the type described in the co-pending application Ser. No. 535,751 entitled, "Sealed Gear Coupling," by Joseph J. Kimmel that is filed concurrently herewith. The gear coupling 1 accommodates any axial relative movement due to thermal expansion or to structural deflection. However, any axial movement of spindle 10 causes blades 40 of hub 26 to axially overlap blades 40 of hub 16 to a greater degree without affecting the axial position of hub 16. The bands 46a, 46b tend to elastically limit the axial movement of spindle 10 since they encircle blades 40 of both hubs 16, 26. Hubs 114 and 116 are mounted to shaft 8 and spindle 10 by splines 115 and 117 made in the shafts and hubs similar to spline 18 previously described for the shaft 12 and hub 16.

Hub 116 has an axially extending sleeve portion 118 on which external spur gear teeth 120 are formed. Hub 114 has an axially extending sleeve portion 122 on which internal spur gear teeth 124 are formed and which axially overlaps the external teeth 120 in driving relationship. The external teeth 120 are made in the conventional manner and cooperate with the internal teeth to accommodate angular and axial misalignment of the respective shafts.

An axially extending flange portion 126 is provided on hub 116 so that it axially overlaps the sleeve portion 122 of hub 114. As illustrated herein, hub 116 and flange 126 are secured by screws 127. An internal annular groove 128 is provided in flange portion 126 in which an O-ring 130 and back-up rings 132 are placed so that the O-ring bears against sleeve portion 122 to effectively seal lubricant within a cavity surrounding the meshing gear teeth. The inside circumference of sleeve 118 of hub 16 has a similar groove formed therein in which is placed an O-ring 134 and back-up rings 136 which bear against an internal axially extending flange 138 that is formed on hub 14 and that is axially overlapped by sleeve 18 to effectively seal exhaust gases or other fluids within the hollow portions 140 of the respective shafts.

The nature of gear coupling 11 enables it to compensate for angular misalignment between the axes of shaft 8 and shaft 10. To maintain an effective seal, the O-rings 130 and 134 are in a radial plane 141 passing through the center of the axial length of teeth 120 and intersecting the axis of rotation of hub 116. Upon any angular misalignment of the axes of shafts 8 and 10, the radius of plane 141 is intersected by these axes. This point of intersection is the hinge point 143. Axial displacement manifests itself by a longitudinal movement of teeth 120 relative to teeth 124. Despite such relative movement, the O-rings 130, 134, being placed in grooves in sleeve portions 118, 126 of hub 116, remain in radial plane 141 and are always in the position of being least affected by angular misalignment of the shafts.

Referring again to coupling 14 of FIGURE 3, it can be seen that an axially extending sleeve portion 52 is provided on hub 16 which is axially overlapped by a corresponding sleeve portion 53 on hub 26. An annular recess 56 is provided in sleeve 53 in which O-ring 58 and back-up rings 60 are seated so as to bear against sleeve 52 to effectively seal exhaust gases or other fluids within hollow portions 140.

The back-up rings 60 are used to prevent extrusion of the O-ring due to differential pressures across the O-ring. Another back-up ring 54 is a split ring, preferably of phenolic impregnated fiber that also functions to center hub 16 with respect to hub 26. In applications where sealing of fluids within the shafts is not required, the O-ring and back-up rings may be omitted. The back-up ring 54 will usually be required to accomplish centering of the hubs as stated above although, in some applications, it may be omitted.

Advantageously, O-rings, generally referred to by numeral 62 although of different sizes, are placed in suitable grooves where the various components of the coupling are joined to prevent the escape of fluids through the joints. As indicated in FIGURE 2, a shim ring 63 is preferably placed between O-ring 62 and teeth 124 to contain the O-ring in its groove.

Conventionally, the sleeve portion 122 having internal spur gear teeth 124 formed therein is made separate from the hub portion 114 with the sleeve portion 122 joined to the hub 114 by means of axially extending bolts threaded into the sleeve portion 122 through an opening provided in the hub portion 114. Advantageously, when space requirements do not permit this type of connection, the bolts 142 may extend radially through the sleeve portion 122 into the hub 114.

The coupling disclosed herein is especially useful in applications such as, for example, where shaft 8 is driven by a gas turbine and the exhaust gases are vented through a hollow portion 140 of the drive shaft itself. The bands 46a, 46b isolate noise from the gas turbine driving shaft 12 through the coupling 14. The coupling is capable of transmitting large torque in the relatively small space available. This is due to the novel arrangement providing a relatively large area of elastomeric material through which torque is transmitted by blades 40. For example, a coupling 14 having an outside diameter of about 8.3 inches has, in laboratory tests, transmitted more than 21,000 inch-pounds torque as opposed to an equivalent size coupling of the type disclosed in Croset Patent No. 2,873,590 which transmits about 10,000 inch-pounds torque. The comparison is believed reasonable in view of the fact that the Croset coupling has been commercially utilized and has received wide recognition in its field. In addition, the coupling can be manufactured economically and assembled easily. Since the portions of the bands 46a, 46b transmitting the torque are always in compression during operation, the best mechanical properties of the rubber, in this case silicone rubber, are utilized.

In some applications, axial misalignment may be present. Coupling 14 readily compensates for this condition since bands 46 can stretch and allow some axial separation of blades 40 while still maintaining portions of the bands in compression for transmitting torque. In cases where one of the shafts may be floating, the tension of bands 46a, 46b around the pairs of blades 48a, 48b tends to control the axial position of the floating shaft. The bands 46a, 46b are also useful for absorbing and damping axial and torsional shock loads to which the coupling is sometimes subjected.

Thus, it can be seen that a novel coupling is provided which will damp sounds normally transmitted by other type couplings used to connect adjoining shafts. The construction is such that the coupling may be preassembled and handled easily prior to actual use since the elastomeric bands flexibly connect the interleaved blades. Worn bands may be easily replaced without dismounting the hubs from the shafts. The elastomeric elements are used advantageously in compression thereby taking advantage of the mechanical properties of natural and synthetic rubbers. The small space required to utilize the greatest surface area of the elastomeric elements contributes to the ability of the coupling to transmit large torques in relation to its size.

Having thus described my invention in its best embodiment and mode of operation, what I desire to claim by Letters Patent is:

1. A flexible coupling for connecting axially spaced driving and driven shafts, comprising:
   a first hub on said driving shaft having a sleeve portion with internal spur gear teeth formed therein;
   a second hub having external spur gear teeth formed thereon for operative engagement with said first hub;
   a third hub on said driven shaft having radially and axially projecting blades;
   a fourth hub having radially and axially projecting blades alternately interleaved with said blades of said third hub and defining spaces therebetween;
   a plurality of elastomeric elements in alternate spaces between said blades connecting the blades of said third hub to the blades of said fourth hub in cooperating pairs; and
   a spindle shaft connecting said second and fourth hubs for rotation therewith;
   said driving and driven shafts and said spindle shaft having centrally positioned hollow portions extending therethrough;
   first sealing means cooperating with said first and second hubs for sealing fluid within said hollow portions; and
   second sealing means cooperating with said third and fourth hubs for sealing fluid within said hollow portions,
   so that fluid contained in said hollow portions cannot escape between said coupling hubs.

2. A flexible coupling for connecting a driving and a driven shaft, comprising:
   a first hub mounted upon said driving shaft having radially and axially projecting blades;
   a second hub mounted upon said driven shaft having radially and axially projecting blades alternately interleaved with said blades of said first hub and defining spaces therebetween; and
   a plurality of elastomeric elements in alternate spaces between said interleaved blades connecting the blades of said first hub to the blades of said second hub in cooperating pairs,
   so that said elastomeric elements are compressed in said alternate spaces between said cooperating pairs upon rotation of said driving shaft; said elastomeric elements being endless bands; said blades having enlarged portions on their periphery for retaining said endless bands during rotation of said coupling; and said endless bands connecting a first set of cooperating pairs of blades in one radial plane and connect a second set of cooperating pairs of blades, circumferentially alternating with said first set, in another radial plane.

3. The coupling of claim 2, and in addition:
   said driving and driven shafts having centrally positioned hollow portions extending therethrough; and
   sealing means cooperating with said first and second hubs for sealing fluid within said shafts.

4. The coupling of claim 3 wherein said sealing means comprises:
   an O-ring seated in a groove provided on one of said hubs; and
   a pair of back-up rings of which one is positioned on either side of said O-ring;
   to maintain a substantially fixed radial relationship between said first and second hubs.

5. A flexible coupling for connecting axially spaced driving and driven shafts, comprising:
   a first hub on said driving shaft having a sleeve portion with internal spur gear teeth formed therein;
   a second hub having external spur gear teeth formed thereon for operative engagement with said first hub;
   said second hub having an outer portion overlying the sleeve portion of said first hub, first sealing means interposed between said first hub sleeve portion and said overlying portion, said first hub having an inner portion underlying a sleeve portion of said second hub, and sealing means interposed between said second hub sleeve portion and said underlying portion, each of said sealing means lying in a radial plane passing through the center of the axial length of said external spur gear teeth;
   a third hub on said driven shaft having radially and axially projecting blades;
   a fourth hub having radially and axially projecting blades alternately interleaved with said blades of said third hub and defining spaces therebetween;
   a plurality of elastomeric elements in alternate spaces between said blades connecting the blades of said third hub to the blades of said fourth hub in cooperating pairs; and
   a spindle shaft connecting said second and fourth hubs for rotation therewith.

References Cited

UNITED STATES PATENTS

| 2,200,641 | 5/1940 | Ricefield | 64—14 |
| 2,446,942 | 8/1948 | McFarland | 64—27 X |
| 2,853,860 | 9/1958 | Crankshaw | 64—9 |
| 2,943,464 | 7/1960 | Voges | 64—14 |
| 3,080,732 | 3/1963 | Crankshaw | 64—11 X |

FOREIGN PATENTS

| 690,228 | 6/1930 | France. |
| 730,521 | 5/1955 | Great Britain. |

HALL C. COE, *Primary Examiner.*